UNITED STATES PATENT OFFICE.

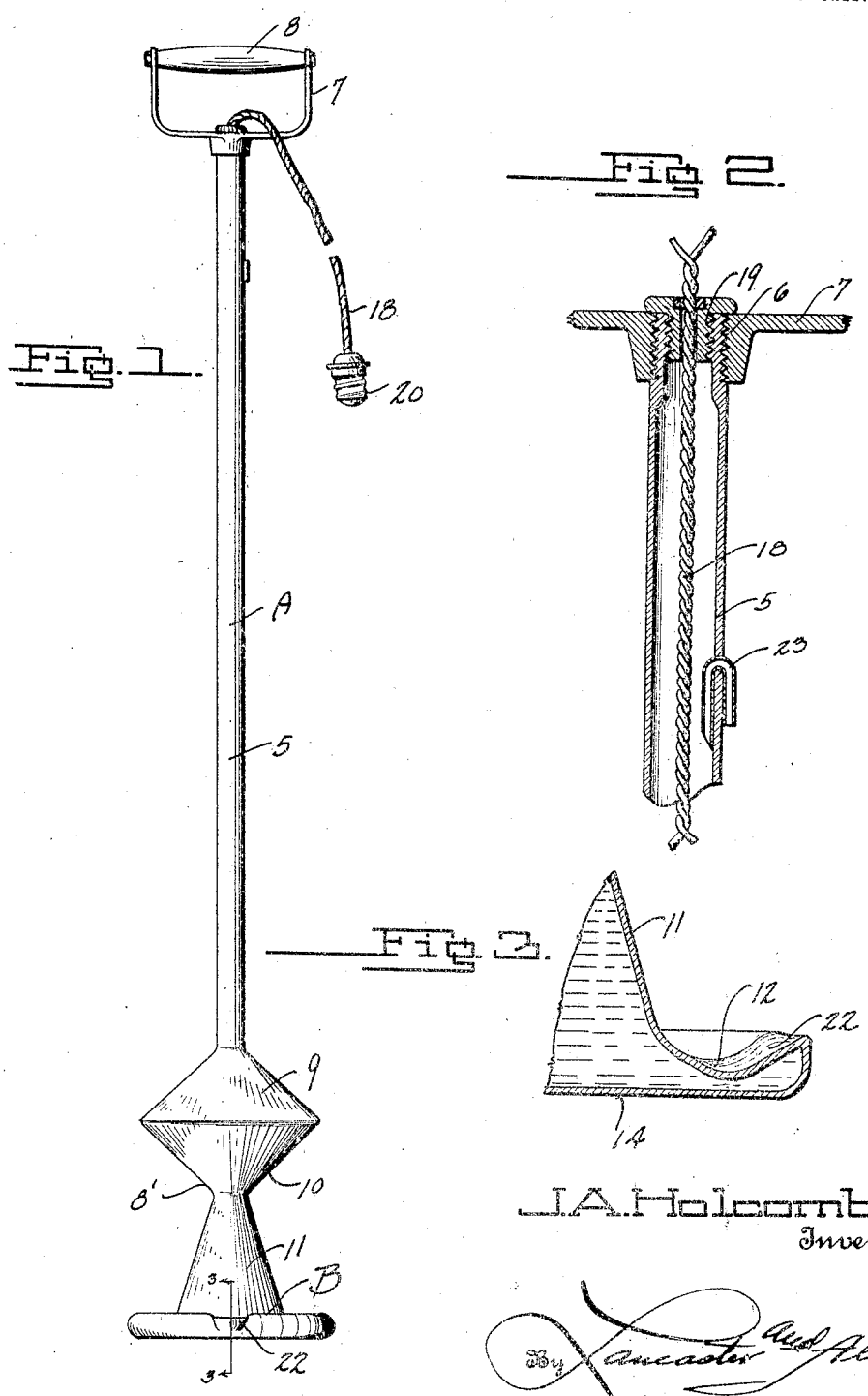

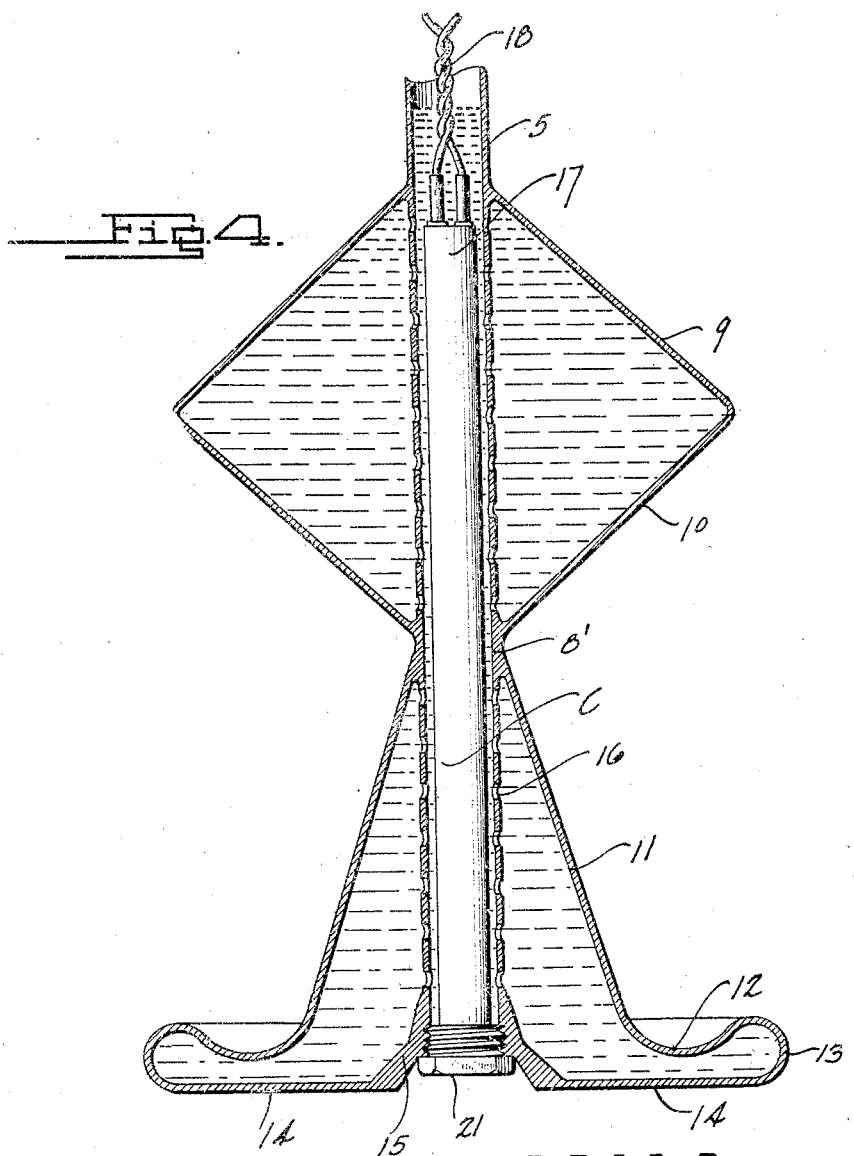

JAMES ALLEN HOLCOMB, OF SAN FRANCISCO, CALIFORNIA.

CREAM-SAMPLER.

1,381,557.  Specification of Letters Patent.  Patented June 14, 1921.

Application filed December 22, 1919. Serial No. 346,570.

*To all whom it may concern:*

Be it known that I, JAMES A. HOLCOMB, a citizen of the United States, residing at San Francisco, in the county of San Francisco and State of California, have invented certain new and useful Improvements in Cream-Samplers, of which the following is a specification.

This invention relates to cream samplers, and the primary object of the invention is to provide an improved cream sampler, which is so constructed as to permit accurate samples to be taken of thick, heavy or frozen cream.

Another object of the invention is the provision of an improved cream sampler having a heating means associated therewith, so that the cream can be readily and quickly warmed so as to permit a correct and accurate sample to be taken from thick or frozen cans of cream.

A further object of the invention is the provision of an improved cream sampler, embodying an improved cream dipper having an electric heating coil or unit associated therewith, the heating coil being arranged in a surrounding bed of water so as to prevent the scorching or injury of the cream during the warming process.

A further object of the invention is to provide an improved cream sampler in which cream will readily slide off of the same after the sample has been taken, so as to prevent particles of the cream adhering thereto and becoming mixed with samples taken from other bodies of cream, and thereby permitting accurate tests being made of each body or can of cream.

A still further object of the invention is to provide an improved cream sampler, stirrer, and heater of the above character, which is durable and efficient in use, one that is simple and easy to manufacture, and one which can be placed upon the market at a reasonable cost.

Other objects of the invention will appear in the following detailed description, taken in connection with the drawings, in which drawings:

Figure 1 is a side elevation of the improved cream sampler.

Fig. 2 is an enlarged fragmentary detail vertical longitudinal section through the upper portion of the sampler.

Fig. 3 is an enlarged fragmentary vertical section through the lower portion of the sampler taken on the line 3—3 of Fig. 1, and Fig. 4 is an enlarged detail longitudinal vertical section through the lower end of the sampler, showing the arrangement of the heating elements therein, and the surrounding film of water.

Referring to the drawings, in detail, wherein similar reference characters designate corresponding parts throughout the several views, the letter A indicates the improved sampler having the dipper B, and the heating element C associated therewith.

The improved cream sampler A has connected with the dipper B, a hollow cylindrical shank or stem 5, having its upper end provided with exterior threads 6 on which is threaded the U-shaped frame 7 carrying the handle 8. The lower end of the shank or stem 5 has rigidly formed thereon or integrally connected therewith the water containing receptacle 8', in which is interposed the heating element C. The water containing receptacle 8' includes a pair of hollow conical members 9, and 10, which have their bases placed one upon the other and integrally connected together. The apex of the lower inverted conical member 10 is connected with the apex of the relatively thin hollow conical member 11, which has its lower end curved downwardly and outwardly to provide an annular trough 12 for the reception of cream, when the sampler is inserted into a can or body of cream. The flange forming the trough 12 is curved upwardly and then downwardly as at 13 and then inwardly to form the supporting base 14, the central portion of which is provided with a hollow stud 15 which is in direct alinement with the apex portions of the cones 9, 10 and 11, and has the lower end of the stem 5 connected therewith, the stem being extended longitudinally through the conical members. The lower end of the stem 5 which is interposed in the cones 9, 10 and 11 is provided with a plurality of openings 16, which communicate with the cones, and this portion of the stem receives the heating element C, which may be of the usual or any preferred type of electric water heater having an outer covering of water proof material and water proof covered lead wires 18 which extend longitudinally through the stem and up through a detachable plug 19 carried by the upper end of the stem, which is provided with internal screw threads to receive the same. The outer end of the wires 18 is provided with suitable plug or other electrical wire connecting mechanism, which is adapted to be inserted into any preferred type of electric socket not shown. The plug 19 may also be removed if so desired, above the stem and form means whereby the cones 9, 10 and 11 may be filled with water.

The rear end of the electric heating element C rests upon a removable cap 21 which is threaded into the stud 15 carried by the supporting base 14. The trough 12 is provided with pouring lip 22 so as to permit the cream to be readily poured from the trough after a sample has been taken from a body of cream.

The improved construction of the water receptacle 8 surrounding the heating unit C is arranged as shown, so as to provide a relatively large radiating surface so as to permit the body of cream to be readily and quickly heated and to also form outwardly extending flanges, so as to form an agitating means to permit the cream to be quickly and thoroughly stirred and mixed, so as to permit a good sample to be obtained therefrom.

While the device can be made from any preferred material, it has been found that heavy blocked tin pressed to the desired configuration and coated with nickel is the most practical.

The superior formation of the device and the fact that the same is heated prevents the adhering of cream to the outer surface thereof thereby preventing particles of one sample of cream becoming mixed with the particles of another sample of cream.

From the foregoing description it can be seen that an improved cream sampler, stirrer and heater is provided which is of exceptionally simple and durable construction, and which will effectively accomplish the purpose intended.

A relatively small inverted V-shaped pipe 23 is carried by and communicates with the stem 5 and forms means for permitting the escape of steam from the stem.

Changes in details may be made without departing from the spirit or scope of my invention; but,

I claim:

1. The combination with a cream sampler including a cream collecting trough, of an electric heating unit removably associated with the sampler.

2. The combination with a cream sampler, of an electric heating coil removably associated therewith.

3. The combination with a cream sampler, of a heating element associated therewith having a surrounding film of water.

4. The combination with a cream sampler, having an irregular exterior providing radiating surfaces, and a heating element carried by the sampler and arranged within the irregular portion of the sampler.

5. The combination with a cream sampler including a cream collecting trough and a water reservoir, of an electric heating unit carried by the sampler and interposed within the water reservoir.

6. The combination with a cream sampler including a hollow stem having a handle formed on one end thereof, a cream collecting trough formed on the opposite end thereof, a water receptacle carried by and communicating with the stem, and a water heating element arranged longitudinally of the stem and interposed within the water reservoir.

7. The combination with a cream sampler comprising a hollow stem, a handle formed on one end of the stem, outwardly extending hollow inter connected conical members formed on the lower end of the stem, an outwardly extending flange formed on the lower conical member having a cream collecting trough formed on its upper surface, of an electric water heating element arranged to extend longitudinally of the stem and arranged within the hollow conical member.

8. A cream sampler comprising a stem, a cream collecting trough arranged on the stem, and means carried by the stem and arranged above the cream collecting trough for coöperation with the trough to agitate the cream.

9. A cream sampler comprising a stem, a handle formed on one end of the stem, an annular outwardly extending cream collecting trough formed on the opposite end of the stem, a pouring lip formed on the trough, and outwardly extending agitating members formed on the stem and arranged above the trough.

10. The combination with a cream sampler including a hollow stem, outwardly extending water containing receptacles formed on the lower end of the stem, the stem having openings formed therein communicating with the receptacle, the lower receptacle having an outwardly flared flange formed thereon, said flange having its upper surface depressed to form a cream collecting trough and a water heating element carried by the stem.

11. The combination with a cream sampler including a hollow stem, a handle detachably associated with the upper end of the stem, hollow conical shaped receptacles carried by the lower end of the stem, the stem having openings formed therein communicating with the conical receptacles, the stem and receptacles being adapted to receive water or other liquid, the lower end of the lowermost receptacle being provided with an outwardly extending annular flange having its upper surface provided with a cream collecting groove, a pouring spout formed on the flange, an electric heating element carried by the lower end of the stem and extending longitudinally of the same, line wires connected to the heating element and extended through the upper end of the same, and a detachable cap carried by the lower end of the stem and supporting said heating element.

JAMES ALLEN HOLCOMB.